(12) United States Patent
Cha et al.

(10) Patent No.: US 12,444,972 B2
(45) Date of Patent: Oct. 14, 2025

(54) POWER CHARGING SYSTEM AND POWER CHARGING METHOD USING ADAPTER WITH BUILT-IN BATTERY

(71) Applicant: Samsung Electronics Co., Ltd., Gyeonggi-do (KR)

(72) Inventors: Jaedeok Cha, Gyeonggi-do (KR); Sunghun Kim, Gyeonggi-do (KR); Jinsoo Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 17/835,088

(22) Filed: Jun. 8, 2022

(65) Prior Publication Data

US 2022/0407344 A1 Dec. 22, 2022

Related U.S. Application Data

(63) Continuation of application No. PCT/KR2022/005080, filed on Apr. 8, 2022.

(30) Foreign Application Priority Data

Jun. 18, 2021 (KR) .......................... 10-2021-0079488

(51) Int. Cl.
*H02J 7/00* (2006.01)
*H01M 10/44* (2006.01)
*H02J 7/34* (2006.01)

(52) U.S. Cl.
CPC ............. *H02J 7/342* (2020.01); *H01M 10/44* (2013.01)

(58) Field of Classification Search
CPC ................................ H02J 7/342; H01M 10/44
USPC .......................................................... 320/106
See application file for complete search history.

(56) References Cited

U.S. PATENT DOCUMENTS

| | | | | |
|---|---|---|---|---|
| 5,723,970 A * | 3/1998 | Bell | ..................... | H02J 7/00714 320/140 |
| 7,166,987 B2 * | 1/2007 | Lee | ......................... | A45F 5/021 206/703 |
| 8,030,900 B2 * | 10/2011 | Hussain | ................ | H02J 7/0069 320/135 |
| 9,093,855 B2 * | 7/2015 | Zhu | ......................... | H02J 7/005 |
| 2008/0246438 A1 * | 10/2008 | Lu | ......................... | H02J 7/0048 320/137 |

(Continued)

FOREIGN PATENT DOCUMENTS

| CN | 107422826 A | 12/2017 |
|---|---|---|
| KR | 10-2009-0112968 A | 10/2009 |

(Continued)

OTHER PUBLICATIONS

International Search Report Dated Jul. 13, 2022.

*Primary Examiner* — Nathaniel R Pelton
(74) *Attorney, Agent, or Firm* — Cha & Reiter, LLC.

(57) ABSTRACT

A charging adapter according to an embodiment comprises: a first battery; and a charging circuit configured to charge the first battery with external power and generate first power, wherein in a fast charging mode, the charging circuit is configured to charge a second battery in an electronic device detachably connected to the charging adapter based on the first power generated and the first battery is configured to generate a second power and charge the second battery with the second power while the charging circuit charges the second battery.

20 Claims, 11 Drawing Sheets

(56) References Cited

U.S. PATENT DOCUMENTS

2011/0148344 A1* 6/2011 Manor .................. H02J 5/00
  320/103
2011/0260694 A1 10/2011 Bourilkov et al.

FOREIGN PATENT DOCUMENTS

| KR | 10-1188358 B1 | 10/2012 |
| KR | 10-2015-0097330 A | 8/2015 |
| KR | 10-1625407 B1 | 5/2016 |
| KR | 10-2016-0128648 A | 11/2016 |
| KR | 10-2191538 B1 | 12/2020 |

* cited by examiner

POWER CHARGING SYSTEM AND POWER CHARGING METHOD USING ADAPTER WITH BUILT-IN BATTERY

CROSS-REFERENCE TO RELATED APPLICATIONS

This application is a Continuation of International Application No. PCT/KR2022/005080 designating the United States, filed on Apr. 8, 2022, in the Korean Intellectual Property Receiving Office and claiming priority to Korean Patent Application No. 10-2021-0079488, filed on Jun. 18, 2021, in the Korean Intellectual Property Office, the disclosures of which are incorporated by reference herein in their entireties.

BACKGROUND

1. Field

The disclosure relates to a power charging technology using an adapter with a built-in battery.

2. Description of Related Art

Power charging systems that rapidly charge a battery to a level that can power an electronic device for the entire day are convenient for the user. However, in order to charge at an acceptable speed, an adapter with a high power capacity may be needed.

SUMMARY

According to an embodiment, a power charging system using an adapter with a built-in battery may perform fast charging by embedding a battery in the adapter and using an output of the built-in battery without an increase of a rated capacity of the adapter.

A charging adapter according to an embodiment comprises: a first battery; and a charging circuit configured to charge the first battery with external power and generate first power, wherein in a fast charging mode, the charging circuit is configured to charge a second battery in an electronic device detachably connected to the charging adapter based on the first power generated and the first battery is configured to generate a second power and charge the second battery with the second power while the charging circuit charges the second battery.

A method according to certain embodiments, comprises: charging a first battery in a charging adapter based on external power and generating first power with a first charging circuit in the charging adapter; and charging a second battery in an electronic device detachably connected to the charging adapter, based on the first power, wherein charging the second battery comprises: charging, in a fast charging mode, the second battery with the first charging circuit based on the first power and with the second battery based on second power.

A charging adapter for an electronic device, according to certain embodiments comprises: a first battery; and a charging circuit configured to charge the first battery based on external power and generate first power, wherein the charging adapter is configured to generate charging power that comprises the first power generated by first charging circuit and selectively includes second power by the first battery.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
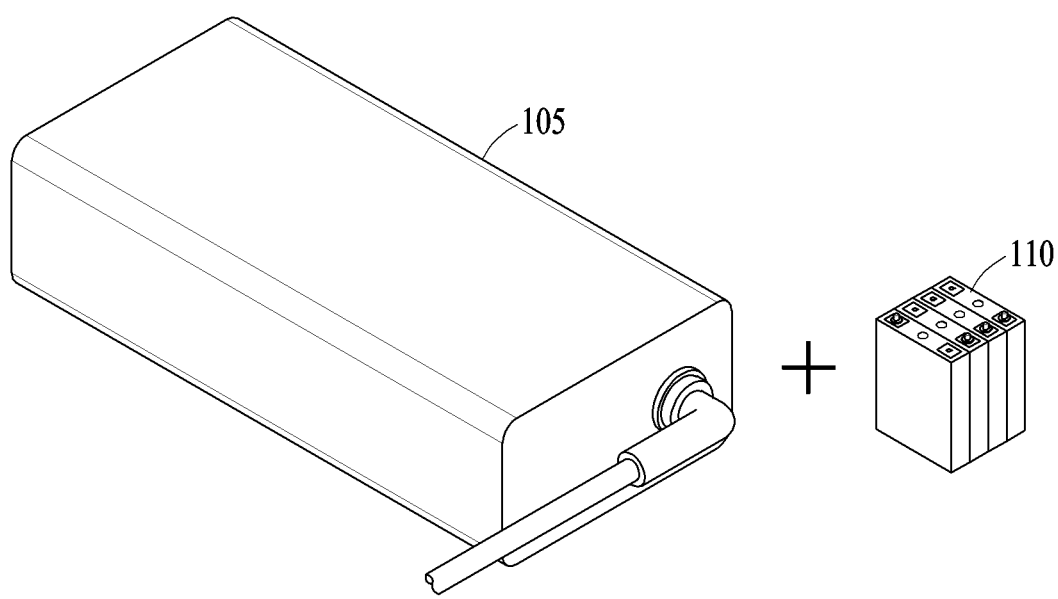
FIG. 1 illustrates a power charging system using an adapter with a built-in battery according to an embodiment.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 illustrates a power charging system using an adapter with a built-in battery according to an embodiment. The adapter 105 (which includes a battery 110) is configured to charge a second battery of a detachably connectable electronic device, when the electronic device is connected to the adapter 105.

Referring to FIG. 1, an adapter 105 and a battery 110 are illustrated, separately, for ease of understanding, although the adapter 105 includes the battery 110.

With high C-rate charge battery cells, mobile electronic devices (such as a phone, a laptop computer, and the like) may be used for an entire day on a single charge. To reduce the time required to charge the battery cells, a, a high C-rate charge cell and a high power AC power adapter may be used, and as well as constant power constant voltage (CPCV) and a cell voltage feedback (CVF). CPCV and CVF reduce a loss of a charging circuit on a board within a system. Step charging can also achieve rapid charging, while reducing cell degradation.

Generally, for rapid charging, a large amount of current is generated for a predetermined time by increasing a received current. Charging at 1 C (hereinafter, "C" referring to a discharge rate) is a general charging scheme of a constant current constant voltage (CCCV), that is symbolically completed within 1 hour (if the tail current time is disregarded). If high C-rate charging at 2 C is performed, and the CCCV is maintained, charging is completed within 30 minutes. A step charging at 2 C may secure stability and life of a cell, while still charging at a sufficient rapid speed. To allow step charging at 2 C, a step charging current control that lowers the charging current to an appropriate level at various time points may be needed to avoid cell degradation. Accordingly, an adapter would need a power capacity that is twice the power capacity needed for charging at 1 C.

When a charge cell with a high C rate, and a high power AC power adapter are provided, fast charging can be achieved. For example, step charging can provide fast charging and safe operation that reduces cell degradation. Reducing cell degradation increases battery life.

During a step charging operation, initial peak power may include a rated capacity of the adapter 105, which is several times a capacity of the second battery that is to be charged. For example, if a second battery is fully charged in 90 minutes through step charging a charge rate of 1.3 C and an adapter that has a capacity that is 1.2 times the capacity of the battery, may be needed. To charge the specific battery in 60 minutes, a charge rate of 2 C and an adapter that has 1.9 times the capacity of the battery may be needed. To fully charge the battery in 30 minutes, a charge rate of 5.5 C and an adapter having a capacity that is 3.5 times the capacity of the battery may be needed.

The step charging may require high power for a predetermined initial time (for example, before and after 10 minutes). If the rated capacity of the adapter 105 is designed to increase the amount of current in order to correspond to such peak power, the design in certain embodiments may be efficient so that the size and cost of the adapter 105 does not increase. Moreover, the portability of the adapter 105 in certain embodiment may not be hindered.

A power charging system using an adapter with a built-in battery according to an embodiment may provide additional power by using the battery 110 in addition to the rated capacity of the adapter 105 by including the battery 110 within the adapter 105 for battery charging, and may cope with the peak power for step charging without an increase of the rated capacity of the adapter 105.

Figure 2:
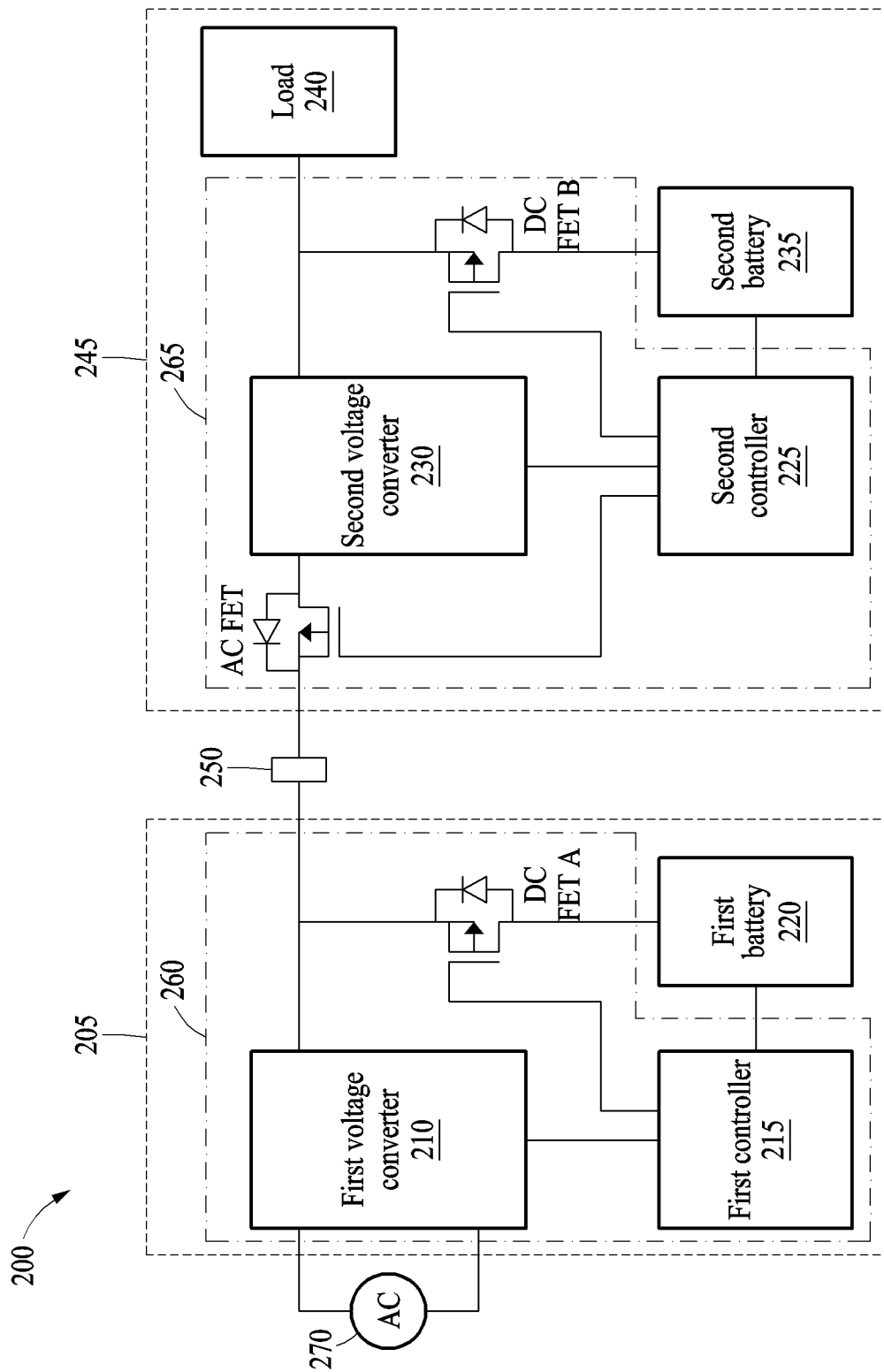
FIG. 2 is a block diagram illustrating a power charging system using an adapter with a built-in battery according to an embodiment connected to an electronic device.

FIG. 2 is a block diagram illustrating a power charging system using an adapter with a built-in battery according to an embodiment connected to an electronic device.

Referring to FIG. 2, a power charging system 200 includes an adapter 205 (hereinafter, referred to as "a charging adapter 205") with a built-in battery, first battery 220 according to an embodiment. The adapter 205 is configured for fast charging, and a detachably connectable electronic device 245 connected to the charging adapter 205 is illustrated. The charging adapter 205 may be configured to supply power required for an operation of the electronic device 245 based on external power 270. The external power 270 may be, for example, power from a power outlet.

The charging adapter 205 according to an embodiment may include a first battery 220, and a first charging circuit 260 that generates a first power and charges the first battery 220. The first power and the charging of the first battery 220 may be based on the external power 270.

The first charging circuit 260 may include a first voltage converter 210 that supplies the first power to the electronic device 245, a first switch DC FET A that connects the first voltage converter 210 to the first battery 220, and a first controller 215 that controls the first voltage converter 210 and the first switch DC FET A. The first voltage converter 210 may provide the output voltage of the charging adapter 205, and supply the output voltage to the electronic device 245 via a DC barrel jack 250. The DC barrel jack 250 can be according to a connection standard for connecting various devices. For example, the DC barrel jack 250 can comprise a USB Type-C standard. A constant current constant voltage (CCCV) control may be performed in the first voltage converter 210 by the first controller 215. Power supplied from the first voltage converter 210 may be supplied to a second voltage converter 230 of the electronic device 245 to charge a second battery 235, and may be supplied to a load 240. The first controller 215 may monitor a state of the first battery 220 by using a system management (SM) bus communication, and control the first switch DC FET A to control charging and discharging of the first battery 220. The first switch DC FET A may be configured to include a transistor and a diode.

According to an embodiment, the load 240 may include a processor (e.g., a main processor and an auxiliary processor), a display module, a memory, a communication module, an audio module, a camera module, and/or a sound output module.

The first battery 220 may discharge electrical energy stored in the first battery 220, and supply second power separately from the first power. The adapter 205 may supply the first power and the second power to the electronic device 245, and thus, peak power required for step charging for the fast charging of the second battery 235 may be generated. The first battery 220 may be included in the charging adapter 205 and may comprise a structure in which a plurality of battery cells are connected in series. For example, by way of example and not limitation, the first battery 220 may be configured in a 4S structure in which four cells are connected in series.

In an embodiment, the first battery 220 may comprise a high C-rate (or a high discharge rate) battery for the fast charging. In another embodiment, the first battery 220 may comprise a super capacitor.

The electronic device 245 may include the second battery 235, a second charging circuit 265. The second charging circuit 265 receives charging power supplied from the charging adapter 205, and charges the second battery 235 based on the received charging power, and the load 240.

The second charging circuit 265 may include the second voltage converter 230, a second switch AC FET that connects the DC barrel jack 250 and the second voltage converter 230, a third switch DC FET B that connects the second battery 235 and the second voltage converter 230, and a second controller 225. The electronic device 245 may perform the step charging for fast charging of the second battery 235 by the second voltage converter 230 and the second controller 225. By way of example, and not limitation, the second voltage converter 230 may be a buck-boost narrow voltage direct current (NVDC) charger. The charging power for the step charging may be supplied by both the first voltage converter 210 of the charging adapter 205, and the first battery 220. The second controller 225 may control the second switch AC FET and the third switch DC FET B in order to control power supply of the second charging circuit 265 and charging and discharging of the second battery 235, respectively. Each of the second switch AC FET and the third switch DC FET B may be configured to include a transistor and a diode. The electronic device 245 of FIG. 2 having various other configurations may also be connected to receive power from the charging adapter 205.

The power charging system 200 may perform charging of the second battery 235 according to either a normal charging mode or a fast charging mode. The mode can be based on a state of the electronic device 245.

The power charging system 200 may charge the second battery 235, in the fast charging mode, based on the charging power that includes the both the first power generated by the first charging circuit 260 and the second power generated by the first battery 220, together. That is, in the fast charging mode, charging power provided to the second battery 235 can be based on the sum of the first power and the second power. The charging power may correspond to the peak power required in a process of the step charging for the fast charging of the second battery 235. The first power may be supplied together with the second power, and thus, peak power may be generated without an increase of a rated capacity of the charging adapter 205. As a result, the charging adapter 205 may be miniaturized and lightened, and may be economically produced.

If the electronic device 245 is in a power saving state or in an OFF state, the power charging system 200 may determine the charging mode to be the fast charging mode.

In an embodiment, the fast charging mode may be a mode in which the charging power is supplied to the electronic device 245 with the first power generated by the first charging circuit 260 of the charging adapter 205 and the second power generated by the first battery 220.

Since the fast charging of the second battery 235 requires high power, the fast charging of the second battery 235 may be performed when the electronic device 245 is in the power saving state or in the OFF state. If the electronic device 245 is in a power saving state or in an OFF state, the charging power of the charging adapter 205 may be used for charging of the second battery 235, and thus, power required for the fast charging may be sufficiently secured. For example, if the electronic device 245 is compatible with the advanced configuration and power interface (ACPI) standard, the fast charging mode may be performed when the electronic device 245 is in an S3 state (a power saving mode) or an S5 state (an OFF state of the electronic device 245). If the electronic device 245 is in an ON state (e.g., an S0 state (an operating state of the electronic device 245)), the load 240 may consume power, and the peak power of the step charging may not be supplied to the second battery 235, and accordingly, the power charging system 200 may not determine the charging mode to be the fast charging mode.

In an embodiment, the power saving state may be an S3 state (a power saving mode or a sleep mode) or a standby mode. For example, if the electronic device 245 is in a power saving state, power may be supplied to a memory (not illustrated), and power may not be supplied to a processor (not illustrated).

The power state of the electronic device 245 can be detected by the first controller 215.

The power charging system 200 may charge the second battery 235, in the normal charging mode, based on the first power generated by the first charging circuit 260, but not including second power from the first battery 220. Accordingly, application of the second power from the first battery 220 is selectable, based on the charging mode.

The power charging system 200 may determine the charging mode to be the normal charging mode when the electronic device 245 is in an ON state. If the electronic device 245 is in an ON state, sufficient power for the fast charging may not be supplied to the second battery 235 by the charging adapter 205, and thus, the power charging system 200 may operate in the normal charging mode.

In the fast charging mode, when a predetermined time elapses after the second battery 235 is charged, or when the first battery 220 is discharged, the power charging system 200 may charge the second battery 235 based on the first power. The predetermined time may be determined according to a characteristic of the second battery 235. A battery characteristic may include, for example, any one or a combination of a discharge rate, a stability, a battery life, an energy density, a level of degradation, a battery capacity, and the like. When the first battery 220 is discharged, no additional second power may be supplied, and thus, the second battery 235 may be charged based on the first power, alone.

In the normal charging mode or the fast charging mode, the first battery 220 may be charged based on surplus power of the first charging circuit 260. Alternatively, if the charging adapter 205 is not connected to the electronic device 245, the first battery 220 may be charged based on the external power 270. When charging of the first battery 220 is completed, the first switch DC FET A may be turned off by the first controller 215. The first controller 215 may turn off the first switch DC FET A in order to reduce battery degradation due to leakage current of the first battery 220 and repeated charging.

When charging of the second battery 235 is started in a fast charging mode, a voltage drop may occur at an output end of the charging adapter 205. The voltage drop may be due to the electronic device 245 demanding high power, and a current may flow via the diode due to a difference in voltages at both ends of the diode of the first switch DC FET A. Thus, supply of the second power may be started. Since a loss when the current flows via a diode is relatively greater than a loss when the current flows via a transistor, the first switch DC FET A may be configured such that the transistor may be turned on and the second power may be supplied via the transistor and the diode if the current flows via the diode for a predetermined time, in order to prevent the loss.

As described above, the fast charging of the second battery 235 may be performed using a step charging scheme. An algorithm of the step charging may be stored in the second controller 225 of the electronic device 245, and may be performed by the second controller 225.

In an embodiment, the second controller 225 may determine charging sections according to a state of charge of the second battery 235 for the step charging, and a charging current to be output by the second voltage converter 230 in each of the charging sections. In the fast charging mode, the second controller 225 may control the second voltage converter 230 to output a corresponding charging current during a charging section corresponding to the state of charge of the second battery 235, based on the charging power supplied from the charging adapter 205.

For example, the second controller 225 may determine a first charging section in which a maximum current allowed by the cell of the second battery 235 is supplied, a second charging section in which a current lower than the first charging section is supplied, and a third charging section in which a current lower than the second charging section is supplied.

In each of the charging sections, a constant current control may be performed by the second voltage converter 230, and a constant voltage control may be performed at a last charging section among the charging sections.

In each of the charging sections, when the second battery 235 is charged to a predetermined level, a next charging section may proceed. The first charging section that is an initial charging section among the charging sections may continue for a predetermined time. For example, the predetermined time may be 3 minutes, and the second charging section may proceed after the maximum current is supplied to the second battery 235 in the first charging section for 3 minutes. The predetermined time may be a time that is predetermined or a time determined by the second controller 225 according to a characteristic of the second battery 235.

The second controller 225 may determine a corresponding charging section according to a state of charge of a battery, and perform charging from the determined charging section. Charging in the first charging section may be performed when a level of charging of the second battery 235 is equal to or less than a threshold value. For example, if charging is started when the threshold value is 5% and a current level of the charging of the second battery 235 is 15%, the second controller 225 may omit the first charging section, and proceed with charging from the second charging section corresponding to a current state of charge of the second battery 235, and thus, a current lower than the first charging section may be supplied to the second battery 235. The threshold value may be predetermined according to a characteristic of the second battery 235, or may be determined by the second controller 225.

However, the charging sections described above are by way of example and not limitation, and the charging section may be determined in other ways. The charging sections and the charging current to be output by the second voltage converter 230 in each of the charging sections may be determined based on a characteristic of the second battery 235.

In another embodiment, the charging sections may be predetermined according to the state of charge of the second battery 235. For example, the first charging section in which the maximum current allowed by the cell of the second battery 235 is supplied for 3 minutes, the second charging section in which a current lower than the first charging section is supplied, and the third charging section in which a current lower than the second charging section is supplied may be predetermined and stored in the second controller 225.

The peak power may be demanded for the fast charging by the electronic device 245 in the first charging section among the charging sections. Power demanded for charging of the second battery 235 in each of the charging sections may be lower than power demanded in a previous charging section. Power demanded for charging of the second battery 235 in the second charging section and in the charging sections after the second charging section may be determined to be satisfied by the first power. For example, if suppliable first power is 100 W at the maximum, the power demanded for charging of the second battery 235 in the second charging section and in the charging sections after the second charging section may be determined to be 100 W or less. The peak power demanded for charging of the second battery 235 in the first charging section may exceed a maximum value of the first power. The peak power may be generated by the first power and the second power being supplied together.

Figure 3:
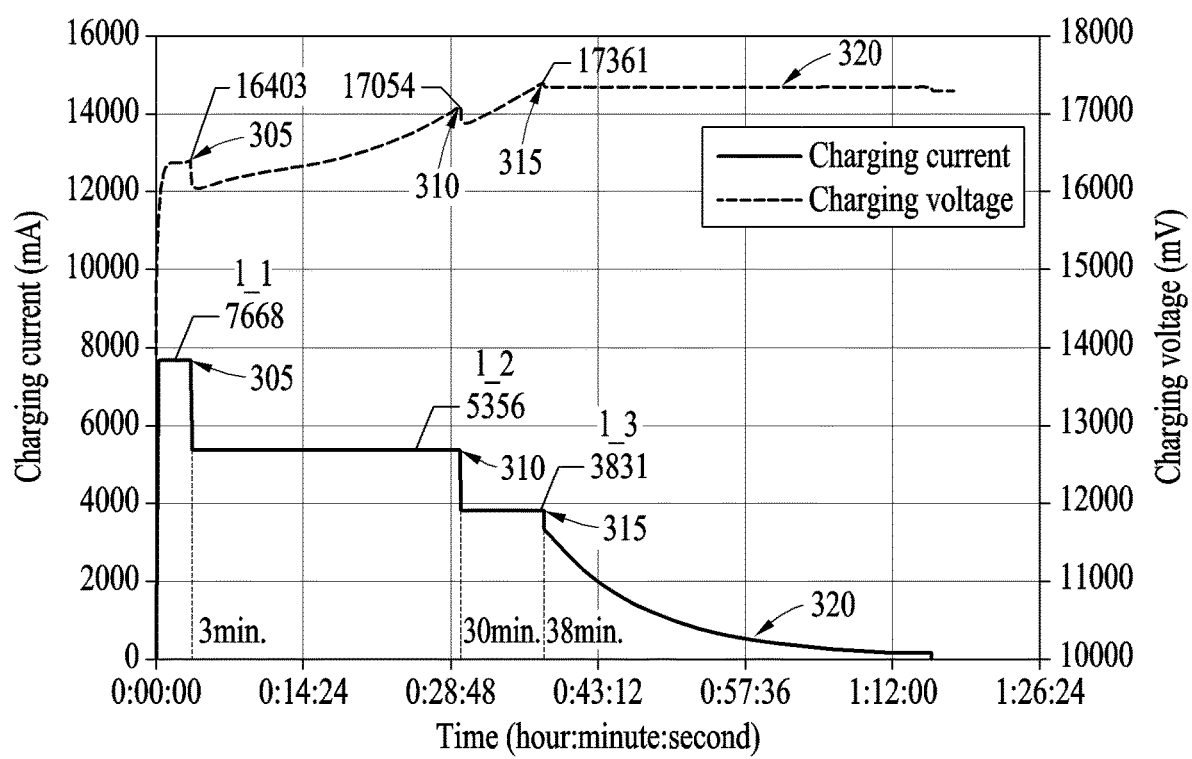
FIG. 3 illustrates step charging performed in a power charging system by using an adapter with a built-in battery according to an embodiment.

FIG. 3 illustrates a graph of charging current and charging voltage as a function of time, while charging a second battery using an adapter with a built-in battery, in accordance with an embodiment of this disclosure.

Referring to FIG. 3, a voltage and a current are graphed with respect to time while step charging in a fast charging mode are illustrated. The electronic device 245 may be in an OFF state or in a power saving state and charged amount of the charge capacity of a second battery 235 is equal to or less than a threshold value. The electronic device 245 may include the second battery 235 having a high discharge rate of 2 C for fast charging.

Since the electronic device 245 is in the OFF state or in the power saving state, charging of the second battery 235 may be performed in the fast charging mode when a charging adapter 205 is connected to the electronic device 245. The charging sections for step charging in the fast charging mode may be predetermined.

Since a current state of charge of the second battery 235 is equal to or less than the threshold value, a second controller may make a determination to perform charging from a first charging section 305. Charging in the first charging section 305 may continue, for example, for 3 minutes. In the first charging section 305, a first output by a first charging circuit 260 is supplied together with a second output by a first battery 220, and thus, peak power may be generated. In an embodiment of FIG. 3, the first power of 100 W is supplied together with the second power of 35 W, and thus, a total amount of the power of 135 W may be supplied to the electronic device 245. In the first charging section 305, the second battery 235 may be fast-charged with an amount of power of 126 W due to a loss of a second voltage converter 230. A constant current control may be performed in the first charging section 305, and for example, a charging current of the second battery 235 may be 7.668 A.

When 3 minutes have elapsed after starting the first charging section 305, charging in a second charging section 310 may be performed in order to reduce battery degradation. A current lower than the current of the first charging section 305 may be supplied to the second battery 235 in the second charging section 310. Power demanded in the second charging section 310 may be lower than the first charging section 305. The power demanded in the second charging section 310 may be lower than a maximum value of the first power. For example, the second battery 235 may be charged with 91.3 W of power based on the first power in the second charging section 310. The constant current control may be performed in the second charging section 310, and for example, the charging current of the second battery 235 may be 5.356 A.

Charging in a third charging section 315 may be performed according to a state of charge of the second battery 235 in the second charging section 310. A current lower than the second charging section 310 may be supplied to the second battery 235 in the third charging section 315. Power demanded in the third charging section 315 may be lower than the second charging section 310. For example, the second battery 235 may be charged with power of 66.5 W based on the first power in the third charging section 315. The constant current control may be performed in the third charging section 315, and for example, the charging current of the second battery 235 may be 3.831 A.

Charging in a fourth charging section 320 may be performed according to a state of charge of the second battery 235 in the third charging section 315. In an embodiment of FIG. 3, the fourth charging section 320 may be a last charging section. A constant voltage control may be performed in the fourth charging section 320 that is the last charging section. For example, the charging voltage of the second battery 235 may be 17.361 V.

As described in an example of FIG. 3, discharging power may be maximized for a predetermined time with less space and fast charging may be performed by including a high C-rate battery in an adapter, and degradation of a battery cell may be reduced while performing the fast charging by performing step charging according to the state of charge of the second battery 235.

Figure 4:
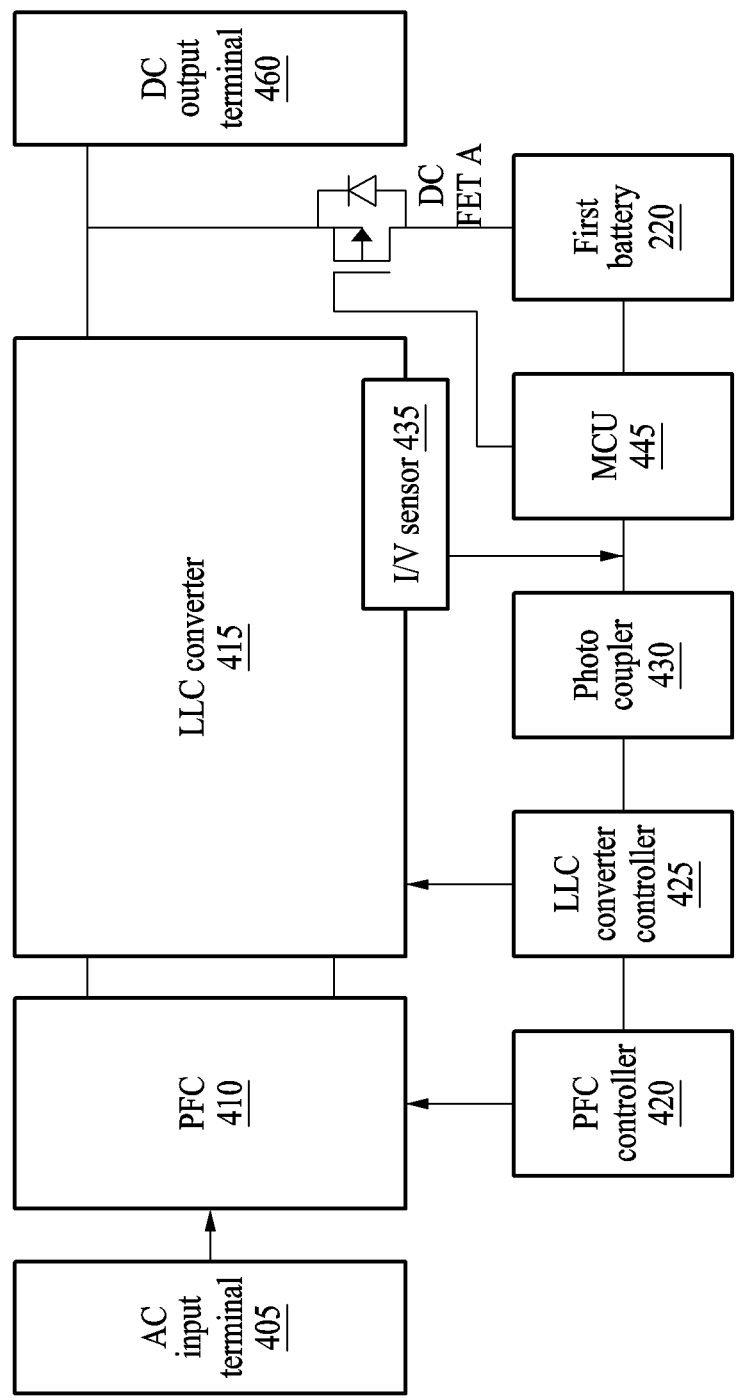
FIG. 4 is a block diagram illustrating a configuration of an adapter with a built-in battery according to an embodiment.

FIG. 4 is a block diagram illustrating a configuration of an adapter with a built-in battery according to an embodiment.

Referring to FIG. 4, a specific configuration of a charging adapter 205 is illustrated. The charging adapter 205 may include an AC power input terminal 405, a power factor correction (PFC) 410, an inductor-inductor-capacitor (LLC) resonant converter 415, a current and voltage sensor 435, a PFC controller 420, an LLC converter controller 425, a photo coupler 430, a micro controller unit (MCU) 445, a first battery 220, a first switch DC FET A, and a DC output terminal 460. Among the elements of FIG. 4, the elements other than the AC input terminal 405, the DC output terminal 460, and the first battery 220 may be included in a first charging circuit 260.

The PFC 410 and the LLC converter 415 may be included in a first voltage converter 210. However, the first voltage converter 210 that includes the PFC 410 and the LLC converter 415 is an embodiment, and the first voltage converter 210 may be configured using other various voltage converter topologies. The AC input terminal 405 may receive external AC power. The charging adapter 205 may further include an electromagnetic interference (EMI) filter (not illustrated) connected to the AC input terminal 405, and a rectifier circuit (not illustrated). The PFC 410 and the LLC converter 415 may generate a DC voltage that meets a specification of an electronic device 245 based on the external AC power. An output of the LLC converter 415 may charge the first battery 220, and may be output via the DC output terminal 460.

The PFC controller 420, the LLC converter controller 425, the photo coupler 430, the MCU 445, and the first switch DC FET A may be included in a first controller 215.

The PFC controller 420 may control the PFC 410 to perform a constant voltage control, and the LLC converter controller 425 may control the LLC converter 415 to perform a CCCV control. For an accurate control, an output voltage and an output current of the LLC converter 415 may be sensed by a voltage and current sensing circuit, and may be provided as feedback to the PFC controller 420 and the LLC converter controller 425 via the photo coupler 430.

The MCU 445 may include a processor and a memory. The MCU 445 may monitor a state of the first battery 220 by using an SM bus communication, and control turning the first switch DC FET A ON or OFF when the first battery 220 is charged or discharged.

A power charging system 200 for the electronic device 245 may include the charging adapter 205 including the first battery 220, and the first charging circuit 260 that charges the first battery 220 based on external power 270, and generates first power, and the electronic device 245 including a second battery 235, and a second charging circuit 265 that receives charging power supplied from the charging adapter 205, and charges the second battery 235 based on the received charging power, and in a fast charging mode, the second battery 235 may be charged based on the charging power including the first power generated by the first charging circuit 260 and second power generated by the first battery 220.

In a normal charging mode, the second battery 235 may be charged based on the first power generated by the first charging circuit 260.

The first battery 220 may be charged based on surplus power of the first charging circuit 260.

In a fast charging mode, the second battery 235 may be charged based on the first power when a predetermined time elapses after charging of the second battery 235 is started, or when the first battery 220 is discharged.

If the charging adapter 205 is not connected to the electronic device 245, the first battery 220 may be charged based on the external power 270.

If the electronic device 245 is in a power saving state or in an OFF state, a charging mode may be determined to be the fast charging mode.

If the electronic device 245 is in an ON state, the charging mode may be determined to be the normal charging mode.

The first charging circuit 260 may include the first voltage converter 210 that converts an AC voltage into a DC voltage, the first switch DC FET A connected to the first voltage converter 210 and the first battery 220, and the first controller 215 that monitors the first battery 220, and controls the first voltage converter 210 and the first switch DC FET A.

The second charging circuit 265 may include a second switch AC FET for receiving the first power and the second power, a second voltage converter 230 connected to the second switch AC FET, a third switch DC FET B connected to the second voltage converter 230 and the second battery 235, and a second controller 225 that monitors the second battery 235, and controls the second voltage converter 230, the second switch AC FET and the third switch DC FET B.

The first switch DC FET A may include a transistor and a diode, and in the fast charging mode, the second power may start to be supplied via the diode, and may be supplied via the transistor and the diode when the transistor is turned on after a predetermined time elapses.

In the normal charging mode, the first switch DC FET A may be turned off by the first controller 215 when charging of the first battery 220 is completed.

The second controller 225 may control, in the fast charging mode, the second voltage converter 230 to output a corresponding charging current during a charging section corresponding to a state of charge of the second battery 235 based on the charging power, and the charging section corresponding to the state of charge of the second battery 235 and the corresponding charging current may be predetermined.

The electronic device 245 may further include a load 240 connected to the second charging circuit 265, and in the normal charging mode, the first power may be distributed to the load 240 and the second battery 235.

The charging adapter 205 for the electronic device 245 may include the first battery 220, and the first charging circuit 260 that charges the first battery 220 based on the external power and generates the first power, and may generate the charging power including the first power generated by the first charging circuit 260 and the second power generated by the first battery 220.

If the charging adapter 205 is not connected to the electronic device 245, the first battery 220 may be charged based on the external power.

Figure 5:
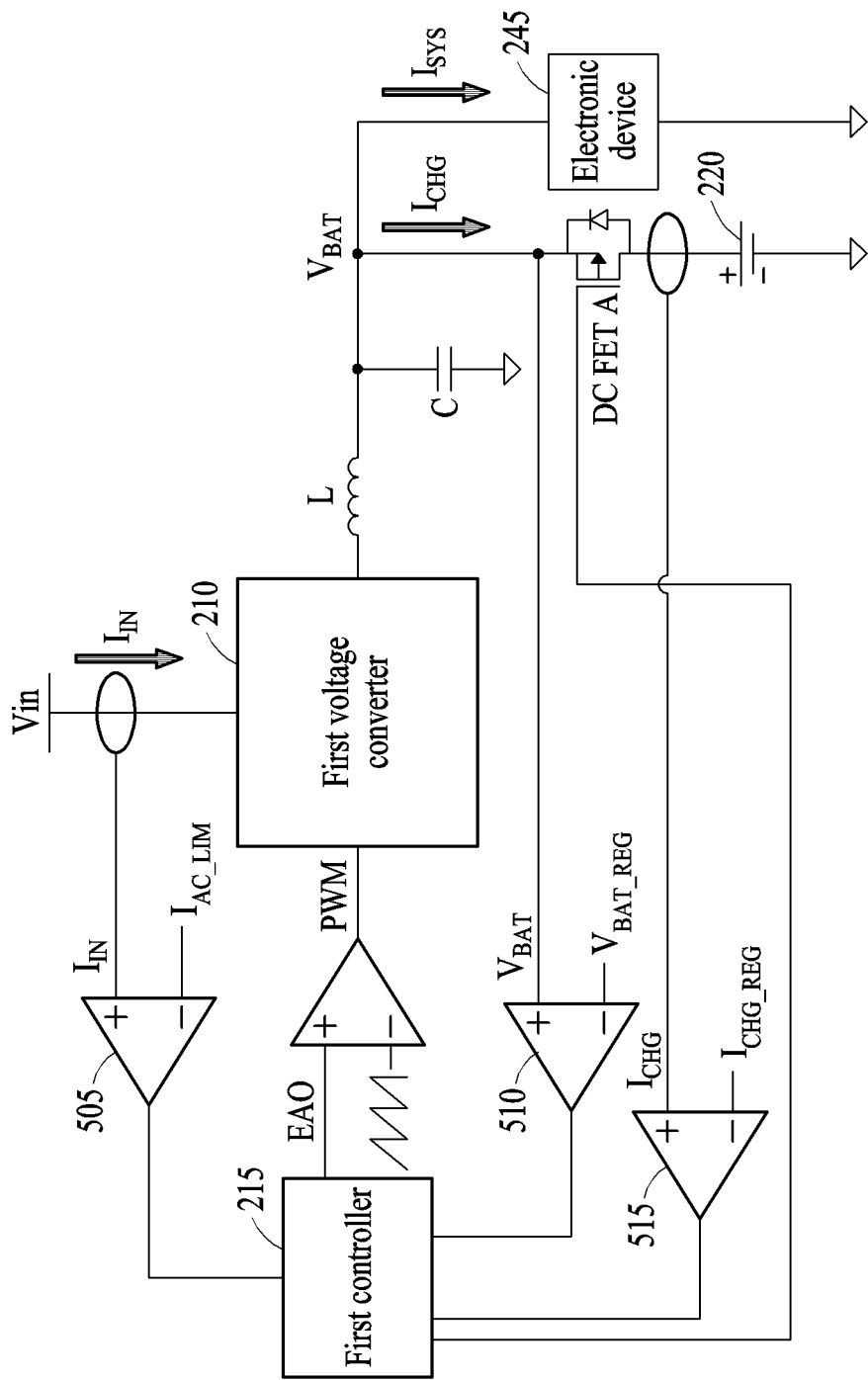
FIG. 5 illustrates a control process of an adapter with a built-in battery according to an embodiment.

FIG. 5 illustrates a control process of an adapter with a built-in battery according to an embodiment.

Referring to FIG. 5, voltage and current signals controlled by a first controller and a first voltage converter in an adapter are illustrated.

An input voltage Vin may be an output voltage of a PFC 410. The charging adapter 205 may sense an input current $I_{IN}$ of a charging adapter 205, an output voltage $V_{BAT}$ of the charging adapter 205, and a charging current $I_{CHG}$ of a first battery 220. Operational amplifiers (OP-AMPs) 505, 510, and 515 may compare the foregoing with a target input current $I_{ACL\_LIM}$ of the charging adapter 205, a target output voltage $V_{BAT\_REG}$ of the charging adapter 205, and a target charging current $I_{CHG\_REG}$ of the first battery 220, respectively, that are control target values. The first controller 215 may perform a CCCV control of an output of a first voltage converter 210 via the first voltage converter 210, based on a comparison result, and output first power. The first battery 220 may be charged by an output of a constant current or a constant voltage of the first voltage converter 210 corresponding to the first power, and power may be supplied to the electronic device 245.

The first controller 215 may control an input current based on the target input current $I_{AC\_LIM}$ such that power that exceeds a rated capacity of the first voltage converter 210 may not be output via the first voltage converter 210. In a fast charging mode, if an output current $I_{sys}$ of the charging adapter 205 gradually increases after charging is started, and a value of the input current $I_{IN}$ becomes greater than a value of the target input current $I_{AC\_LIM}$, the first controller 215 may lower the target charging current $I_{CHG\_REG}$ of the first battery 220 to gradually decrease the charging current $I_{CHG}$ of the first battery 220. The first controller 215 may decrease the charging current $I_{CHG}$ of the first battery 220, thereby corresponding to an increase of the output current $I_{SYS}$ of the charging adapter 205.

If the output current $I_{SYS}$ of the charging adapter 205 continually increases even after the charging current $I_{CHG}$ of the first battery 220 becomes "0", the input current $I_{IN}$ may increase in order to further supply power, and the first controller 215 may control the input current $I_{IN}$ based on the target input current $I_{AC\_LIM}$ for circuit protection. When the input current $I_{IN}$ is controlled, a voltage drop of the output voltage $V_{BAT}$ of the charging adapter 205 occurs, and due to a difference in voltages of both ends of the diode included in the first switch DC FET A, power of the first battery 220 may be discharged via the diode, and the second power may be supplied. The first power of the first voltage converter 210 may be supplied together with the second power of the first battery 220 to the electronic device 245, and thus, fast charging of a second battery 235 may be performed.

When a predetermined time elapses after supply of the second power is started via the diode, the transistor of the first switch DC FET A may be turned on. Since a loss when a current flows via the diode is greater than a loss when a current flows via the transistor, a loss of power may be reduced by supplying the second power via the transistor and the diode due to the transistor being turned on. The transistor of the first switch DC FET A itself may be configured to be turned on when a current flows for a predetermined time via the diode, and the second power may be supplied via the transistor and the diode. Alternatively, if a current flows for a predetermined time via the diode by sensing a voltage and a current of the first battery 220, the transistor may be turned on by the first controller 215.

As the second battery 235 of the electronic device 245 is charged, the output voltage $V_{BAT}$ of the charging adapter 205 that is lowered may be raised. If the output voltage $V_{BAT}$ is raised, the transistor and the diode of the first switch DC FET A may be turned off, and discharging of the first battery 220 may be ceased.

Figure 6:
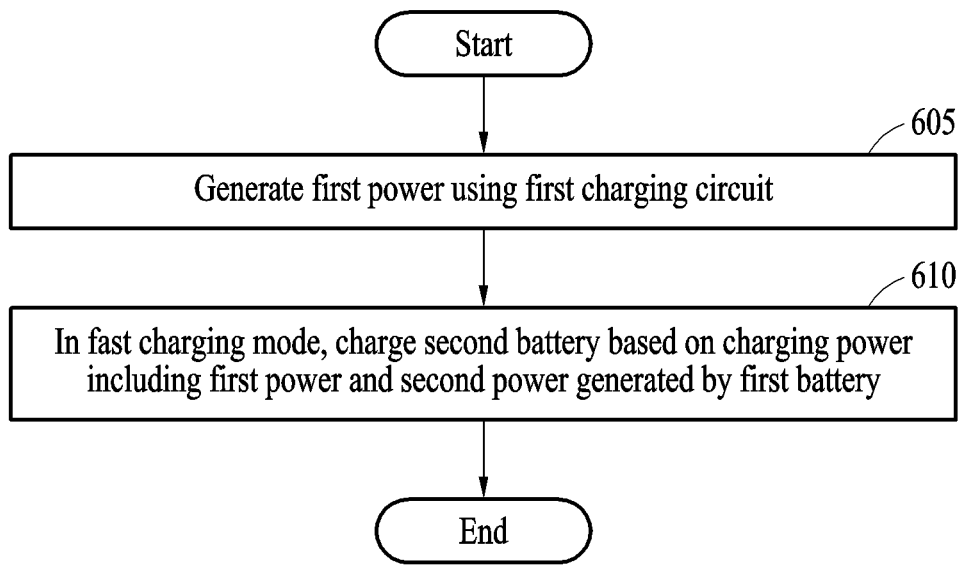
FIG. 6 is a flowchart illustrating a power charging method using an adapter with a built-in battery according to an embodiment.

FIG. 6 is a flowchart illustrating a power charging method using an adapter with a built-in battery according to an embodiment.

In operation 605, a power charging system 200 may charge a first battery 220 included in a charging adapter 205 based on external power 270, and generate first power by using a first charging circuit 260 included in the charging adapter 205. Charging of the first battery 220 may be performed by the first power.

If the charging adapter 205 is connected to an electronic device 245, the power charging system 200 may charge a second battery 235 included in the electronic device 245 based on the first power.

In operation 610, the power charging system 200 may charge, in a fast charging mode, the second battery 235 included in the electronic device 245 based on charging power including the first power and second power generated by the first battery 220, or a sum of the first power and the second power. The power charging system 200 may use a step charging scheme for fast charging. Regarding the step charging scheme, the description relating to the step charging scheme provided with reference to FIG. 2 may be applied. The first power may be supplied together with the second power to the electronic device 245, and thus, power required for the fast charging of the second battery 235 may be supplied.

In a fast charging mode, when a predetermined time elapses after charging of the second battery 235 is started, or when the first battery 220 is discharged, the power charging system 200 may charge the second battery 235 based on the first power.

In a normal charging mode, the power charging system 200 may charge the second battery 235 based on the first power generated by the first charging circuit 260.

In the fast charging mode, the power charging system 200 may charge the second battery 235 by using the step charging scheme. Peak power required for the step charging may be supplied by the first power and the second power.

If the charging adapter 205 is not connected to the electronic device 245, the power charging system 200 may charge the first battery 220 based on the external power 270. In the normal charging mode or the fast charging mode, the power charging system 200 may charge the first battery 220 by surplus power of the first charging circuit 260.

Figure 7:
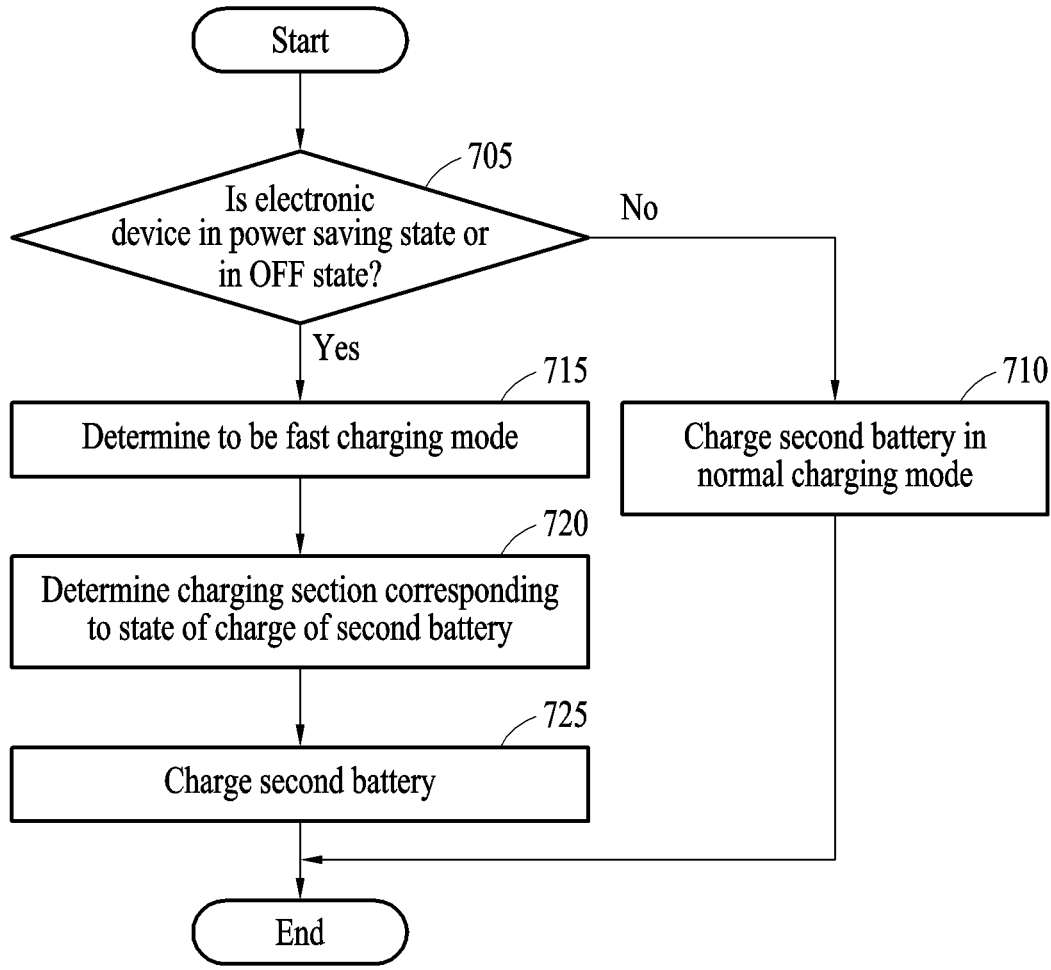
FIG. 7 is a flowchart illustrating a charging process according to a charging mode in a power charging method using an adapter with a built-in battery according to an embodiment.

FIG. 7 is a flowchart illustrating a charging process according to a charging mode in a power charging method using an adapter 205 with a built-in battery according to an embodiment.

A power charging system 200 may determine any one charging mode of a normal charging mode and a fast charging mode based on a state of an electronic device 245, and perform charging of a second battery 235 according to a determined charging mode.

In operation 705, the power charging system 200 may determine whether the electronic device 245 is in a power saving state or in an OFF state. The first controller 215 can detect whether the electronic device 245 is in the power saving or OFF state.

In operation 705, if the electronic device 245 is not in a power saving state and not in an OFF state, the power charging system 200 may determine a charging mode to be a normal charging mode in operation 710. For example, if the electronic device 245 is in an ON state, the power charging system 200 may determine the charging mode to be a normal charging mode. In the normal charging mode, the second battery 235 may be charged based on first power of the first charging circuit 260.

In operation 715, if the electronic device 245 is in a power saving state or in an OFF state, the power charging system 200 may determine the charging mode to be a fast charging mode. In the fast charging mode, the power charging system 200 may perform charging of the second battery 235 by using a step charging scheme. The description provided with reference to FIG. 2 may be applicable to the description relating to charging sections according to a state of charge of the second battery 235 and a charging current of the second battery 235 in each of the charging sections.

In operation 720, the power charging system 200 may determine a corresponding charging section according to the state of charge of the second battery 235 for the step charging. For example, if a level of charging of the second battery 235 is below a threshold value (e.g., 5%), the power charging system 200 may determine a first charging section to be a corresponding charging section.

In operation 725, the power charging system 200 may charge the second battery 235 with a charging current corresponding to the determined charging section. As the second battery 235 is charged in the corresponding charging section, the power charging system 200 may proceed to a next charging section. For example, if the first charging section is to determined in operation 720, the power charging system 200 may provide a maximum charging current to the second battery 235 based on the first power by the first charging circuit 260 and the second power by the first battery 220. In an embodiment, the first charging section may continue for a predetermined time. When the predetermined time elapses, the power charging system 200 may perform charging in a second charging section. In the second charging section and in the charging sections after the second charging section, charging of the second battery 235 may be performed based on the first power.

The power charging system 200 may perform a constant voltage control in a last charging section among the charging sections based on output power of the charging adapter 205, and perform a constant current control in the other charging sections.

The power charging system 200 may proceed until the last charging section according to the state of charge of the second battery 235 to fully charge the second battery 235.

A power charging method according to an embodiment may include charging the first battery 220 included in the charging adapter 205, based on the external power 270, and generating the first power by using the first charging circuit 260 included in the charging adapter 205, and if the charging adapter 205 is connected to the electronic device 245, charging the second battery 235 included in the electronic device 245 based on the first power. The charging may include charging the second battery 235, in the fast charging mode, included in the electronic device 245, based on the charging power including the first power, and the second power generated by the first battery 220.

The charging may further include charging the second battery 235, in the fast charging mode, based on the first power, when a predetermined time elapses after charging of the second battery 235 is started, or when the first battery 220 is discharged.

The charging may further include charging the second battery 235, in the normal charging mode, based on the first power generated by the first charging circuit 260.

The power charging method may further include determining a charging mode, and the determining of the charging mode may include determining the charging mode to be a fast charging mode if the electronic device 245 is in a power saving state or in an OFF state, and determining the charging mode to be a normal charging mode if the electronic device 245 is in an ON state.

FIGS. 8 through 12 illustrate a power charging system using an adapter with a built-in battery according to various embodiments.

Figure 8:
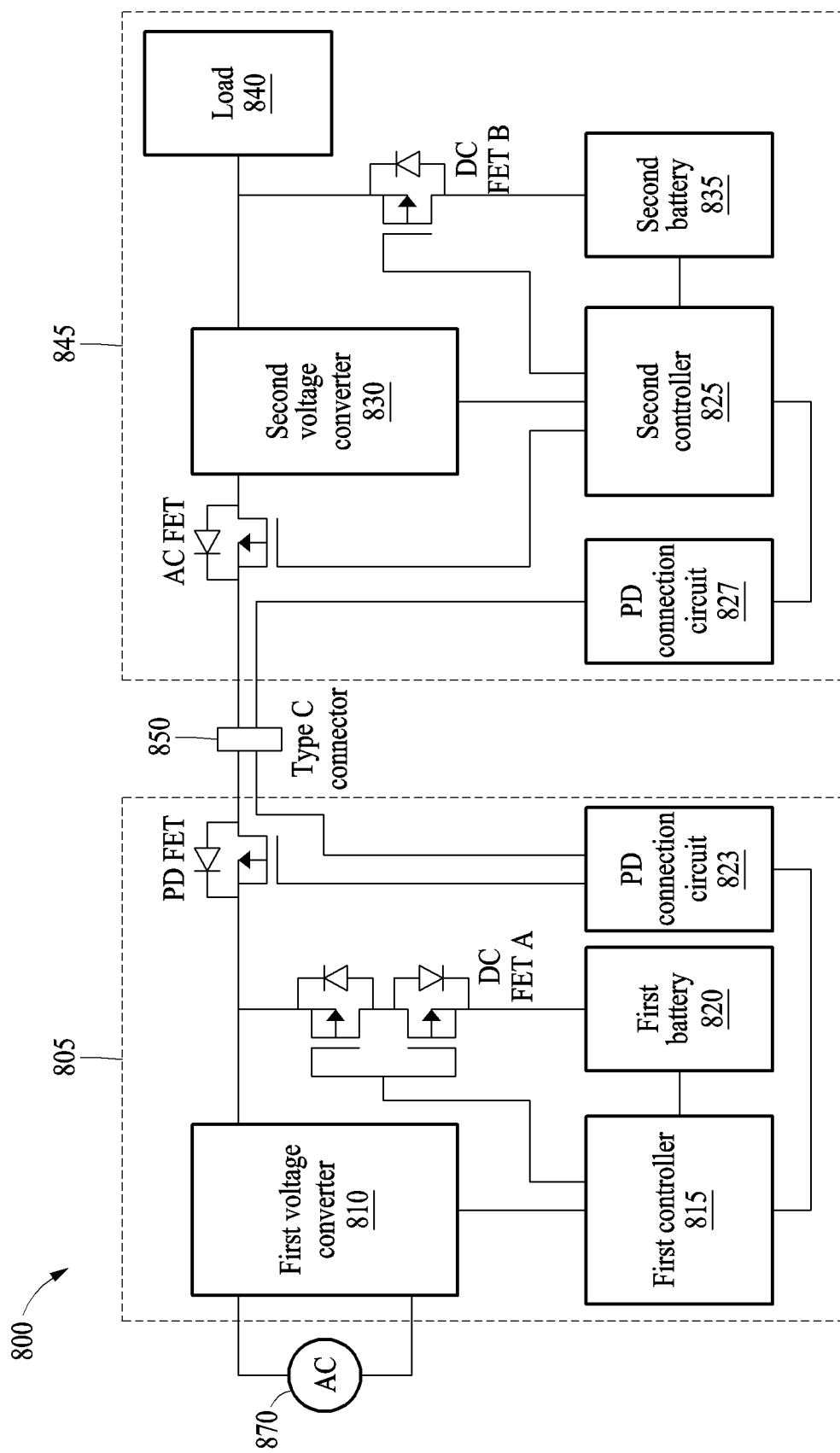
FIGS. 8 through 12 illustrate a power charging system using an adapter with a built-in battery according to various embodiments.

Referring to FIG. 8, a power charging system 800 may include a USB Type-C connector 850, instead of a DC barrel jack, for a connection between a charging adapter 805 and an electronic device 845.

The charging adapter 805 may include a first voltage converter 810 that receives power from external power 870 and supplies first power to the electronic device 845, a first battery 820 that selectively supplies second power to the electronic device 845, a first switch DC FET A that connects the first voltage converter 810 to the first battery 820, a PD connection circuit 823 for USB Type-C connection, a fourth switch PD FET that connects the first voltage converter 810 to the USD Type-C connector 850, and a first controller 815 that controls the first voltage converter 810, the first battery 820, the first switch DC FET A, and the PD connection circuit 823.

The electronic device 845 may include a second battery 835, a second voltage converter 830 that receives charging power supplied from the charging adapter 805 and charges the second battery 835 based on the received charging power, a load 840, a third switch DC FET B that connects the second voltage converter 830 to the second battery 835, a PD connection circuit 827 for USB Type-C connection, a second switch AC FET that connects the USD Type-C connector 850 to the second voltage converter 830, and a second controller 825 that controls the second voltage converter 830, the second battery 835, the third switch DC FET B, the second switch AC FET, and the PD connection circuit 827.

For a connection using the USB Type-C connector 850, each of the charging adapter 805 and the electronic device 845 may further include the PD connection circuits 823 and 827.

When the USB Type-C connector 850 is used, if the electronic device 845 is in an ON state (e.g., an S0 state of the ACPI standard) and the charging adapter 805 is connected to the electronic device 845, the charging adapter 805 and the electronic device 845 may be connected with a voltage of 5 V, and a power data object (PDO) negotiation may be performed in the PD connection circuits 823 and 827, and then power may be supplied with a voltage of 15 V or 20 V.

In an embodiment, if the electronic device 845 is in a power saving state or in an OFF state (e.g., an S3 or an S5 state of the ACPI standard), and a level of charging of the second battery 835 is equal to or less than a threshold value (e.g., 5%), charging may be performed by the charging power including or based on the sum of the first power and the second power by the charging adapter 805In this case, the power charging system 800 may not perform the PDO negotiation, and may perform a CCCV control by the first voltage converter 810 by turning on the first switch DC FET A, and fast charge the second battery 835 by the charging power including the first power and the second power.

Figure 9:
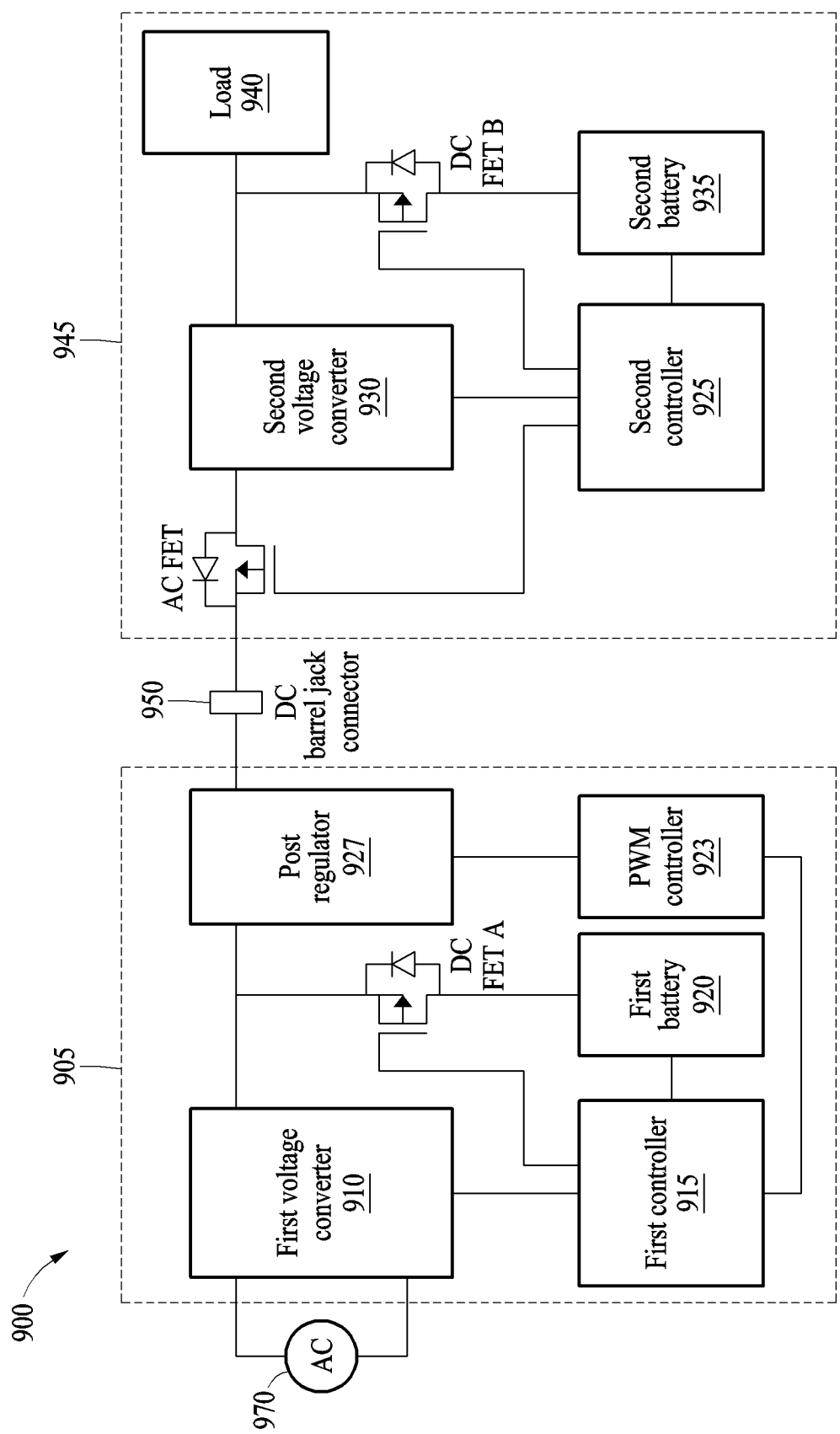

Referring to FIG. 9, a power charging system 900 according to another embodiment may include a charging adapter 905 and an electronic device 945 connected to the charging adapter 905 via a DC barrel jack 950, wherein the charging adapter 905 includes a post regulator 927 and a pulse width modulation (PWM) controller 923 for control of the post regulator 927.

The charging adapter 905 may include a first voltage converter 910 that receives power from external power 970 and supplies first power to the electronic device 945, a first battery 920 that selectively supplies second power to the electronic device 945 based on the charging mode, a first switch DC FET A that connects the first voltage converter 910 to the first battery 920, the post regulator 927 that controls an output voltage of the charging adapter 905, the PWM controller 923 for control of the post regulator 927, and a first controller 915 that controls the first voltage converter 910, the first switch DC FET A, the first battery 920, and the PWM controller 923.

The electronic device 945 may include a second battery 935, a second voltage converter 930 that receives charging power supplied from the charging adapter 905 and charges the second battery 935 based on the received charging power, a load 940, a third switch DC FET B that connects the second voltage converter 930 to the second battery 935, a second switch AC FET that connects the DC barrel jack 950 to the second voltage converter 930, and a second controller 925 that controls the second voltage converter 930, the third switch DC FET B, the second battery 935, and the second switch AC FET.

The power charging system 900 may further include the post regulator 927, thereby more accurately controlling the charging power provided to the electronic device 945. The post regulator 927 may provide a constant output voltage regardless of an input voltage.

Figure 10:
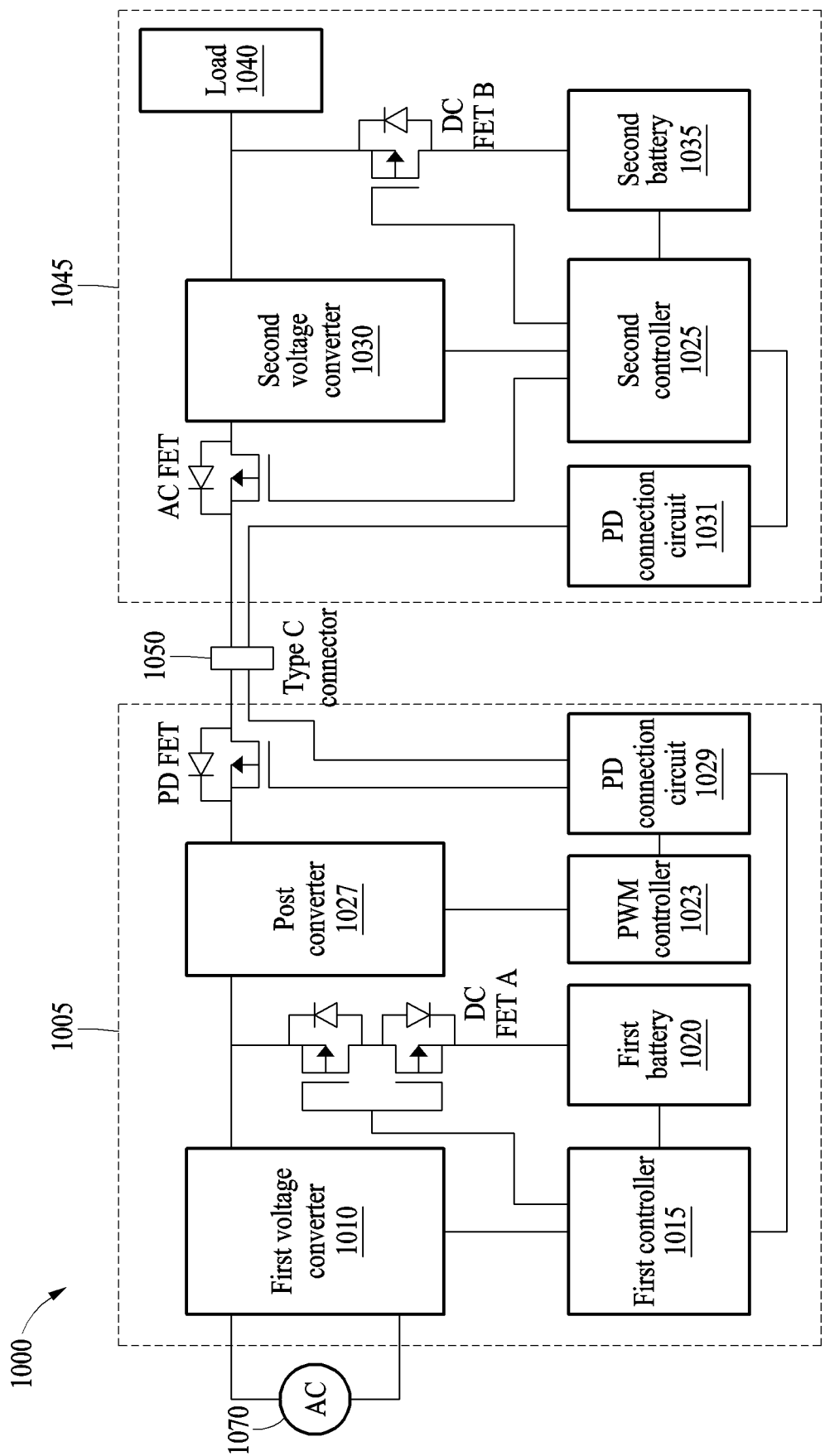

Referring to FIG. 10, a power charging system 1000 according to another embodiment may include a charging adapter 1005 and an electronic device 1045 connected to the charging adapter 1005 using a USB Type-C connector 1050, wherein the charging adapter 1005 includes a post converter 1027 and a PWM controller 1023 for control of the post converter 1027. For a connection using the USB Type-C connector 1050, the charging adapter 1005 and the electronic device 1045 may respectively further include PD connection circuits 1029 and 1031.

The charging adapter 1005 may include a first voltage converter 1010 that receives power from external power 1070 and supplies first power to the electronic device 1045, a first battery 1020 that selectively supplies second power to the electronic device 1045 based on the charging mode, a first switch DC FET A that connects the first voltage converter 1010 and to first battery 1020, the post converter 1027, the PWM controller 1023, a PD connection circuit 1029, and a first controller 1015 that controls the first voltage converter 1010, the first battery 1020, the first switch DC FET A, and the PD connection circuit 1029.

The electronic device 1045 may include a second battery 1035, a second voltage converter 1030 that receives charging power supplied from the charging adapter 1005 and charges the second battery 1035 based on the received charging power, a load 1040, a third switch DC FET B that connects the second voltage converter 1030 to the second battery 1035, a PD connection circuit 1031 for a USB Type-C connection, a second switch AC FET that connects the USB Type-C connector 1050 to the second voltage converter 1030, and a second controller 1025 that controls the second voltage converter 1030, the second battery 1035, the third switch DC FET B, the second switch AC FET, and the PD connection circuit 1031.

If the electronic device 1045 is in a power saving state or in an OFF state (e.g., an S3 or an S5 state of the ACPI standard), and a level of charging of the second battery 1035 is equal to or less than a threshold value (e.g., 5%), the power charging system 1000, like the power charging system 800 of FIG. 8, may not perform a PDO negotiation, and may perform a CCCV control by the first voltage converter 1010 and the post converter 1027 by turning on the first switch DC FET A, and fast charge the second battery 1035 by the charging power including the first power and the second power.

The power charging system 1000 may include a post converter, thereby more accurately controlling an output voltage and an output current of the charging adapter 1005.

Figure 11:
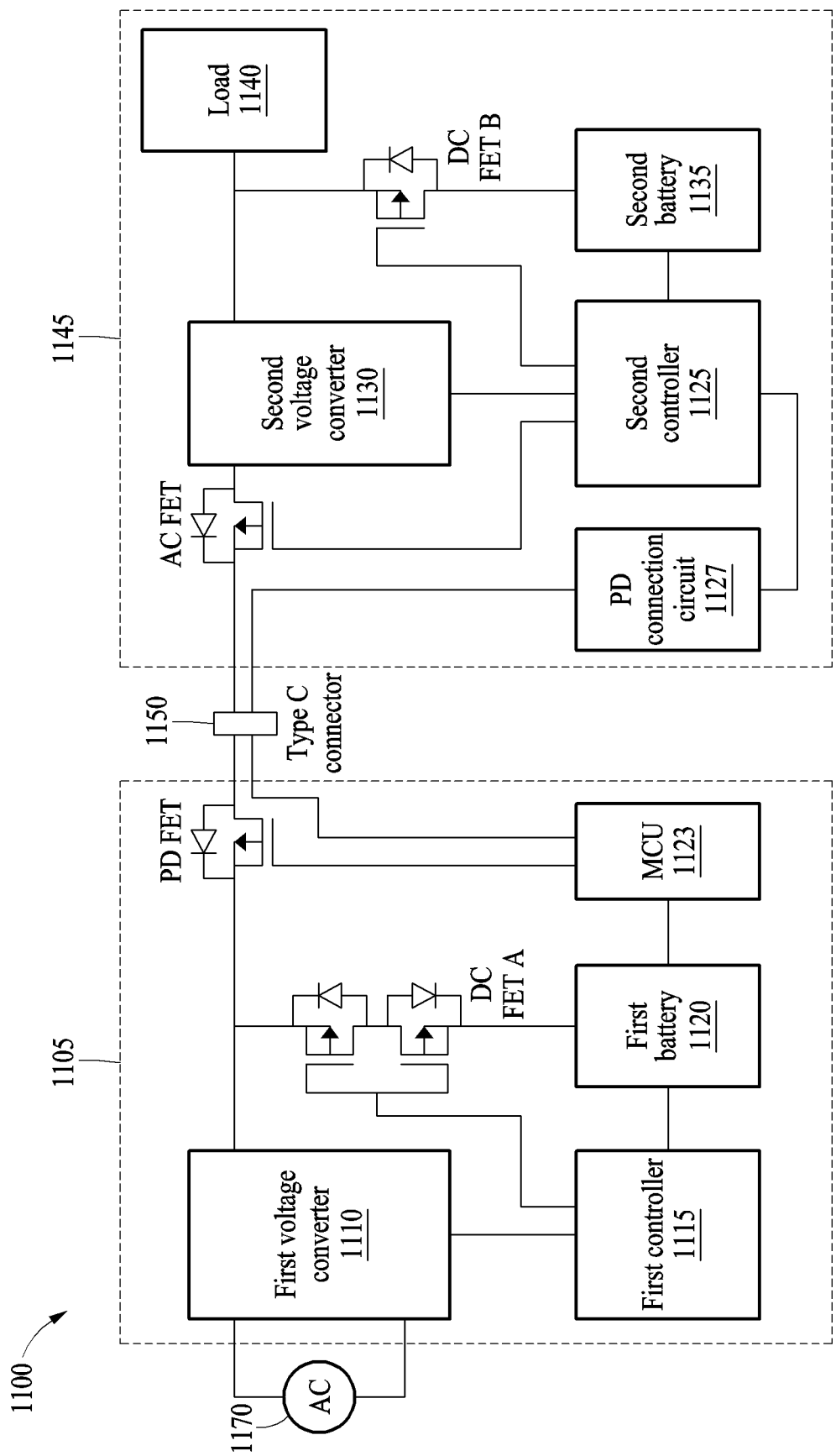

Referring to FIG. 11, in another embodiment, a charging adapter 1105 and an electronic device 1145 of a power charging system 1100 may be connected using a USB Type-C connector 1150. The power charging system 1100, unlike the embodiments of FIGS. 2 and 4, may include an MCU 1123 arranged separate from a first controller 1115. The MCU 1123 may perform a role of a PD connection circuit to control a connection between the charging adapter 1105 and the electronic device 1145.

The charging adapter 1105 may include a first voltage converter 1110 that receives power from external power 1170 and supplies first power to the electronic device 1145, a first battery 1120 that selectively supplies second power to the electronic device 1145 based on the charging mode, a first switch DC FET A that connects the first voltage converter 1110 to the first battery 1120, the MCU 1123, a fourth switch PD FET that connects the first voltage converter 1110 to the USB Type-C connector 1150, and the first controller 1115 that controls the first voltage converter 1110, the first battery 1120, and the first switch DC FET A.

The electronic device 1145 may include a second battery 1135, a second voltage converter 1130 that receives charging power supplied from the charging adapter 1105 and charges the second battery 1135 based on the received charging power, a load 1140, a third switch DC FET B that connects the second voltage converter 1130 to the second battery 1135, a PD connection circuit 1127 for a USB Type-C connection, a second switch AC FET that connects the USB Type-C connector 1150 to the second voltage converter 1130, and a second controller 1125 that controls the second voltage converter 1130, the second battery 1135, the third switch DC FET B, the second switch AC FET, and the PD connection circuit 1127.

If the electronic device 1145 is in a power saving state or in an OFF state (e.g., an S3 or an S5 state of the ACPI standard), and a level of charging of the second battery 1135 is equal to or less than a threshold value (e.g., 5%), the power charging system 1100, like the power charging system of FIG. 8, may not perform a PDO negotiation, and may perform a CCCV control by the first voltage converter 1110 by turning on the first switch DC FET A, and fast charge the second battery 1135 by the charging power including the first power and the second power.

Figure 12:
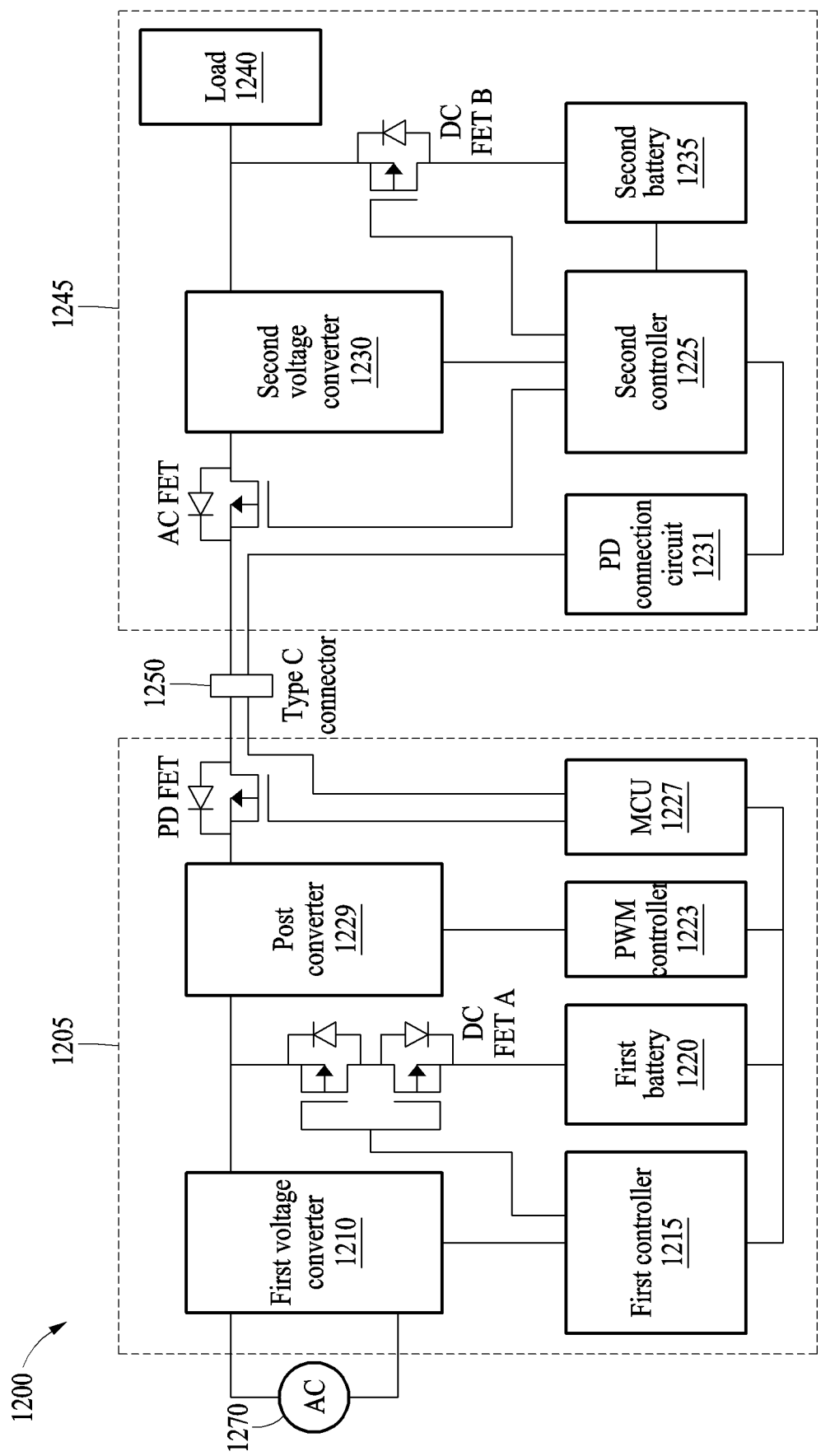

Referring to FIG. 12, a power charging system 1200 according to another embodiment may further include a post converter 1229 and a PWM controller 1223 for control of the post converter 1229, and use a USB Type-C connector 1250 for a connection between a charging adapter 1205 and an electronic device 1245. The power charging system 1200, like the power charging system 1100 of FIG. 11, may include an MCU 1227 arranged separate from a first controller 1215, and the MCU 1227 may perform a role of a PD connection circuit to control a connection between the charging adapter 1205 and the electronic device 1245.

The charging adapter 1205 may include a first voltage converter 1210 that receives power from external power 1270 and supplies first power to the electronic device 1245, a first battery 1220 that selectively supplies second power to the electronic device 1245 based on the charging mode, a first switch DC FET A that connects the first voltage converter 1210 to the first battery 1220, the post converter 1229, a fourth switch PD FET that connects the post converter 1229 to the USD Type-C connector 1250, the PWM controller 1223, the MCU 1227, and the first controller 1215 that controls the first voltage converter 1210, the first battery 1220, the first switch DC FET A, the PWM controller 1223, and the MCU 1227.

The electronic device 1245 may include a second battery 1235, a second voltage converter 1230 that receives charging power supplied from the charging adapter 1205 and charges the second battery 1235 based on the received charging power, a load 1240, a third switch DC FET B that connects the second voltage converter 1230 to the second battery 1235, a PD connection circuit 1231 for a USD Type-C connection, a second switch AC FET that connects the USB Type-C connector 1250 to the second voltage converter 1230, and a second controller 1225 that controls the second voltage converter 1230, the second battery 1235, the third switch DC FET B, the second switch AC FET, and the PD connection circuit 1231.

If the electronic device 1245 is in a power saving state or in an OFF state (e.g., an S3 or an S5 state of the ACPI standard), and a level of charging of the second battery 1235 is equal to or less than a threshold value (e.g., 5%), the power charging system 1200, like the power charging system 800 of FIG. 8, may not perform a PDO negotiation, and perform a CCCV control by the first voltage converter 1210 and the post converter 1229 by turning on the first switch DC FET A, and fast charge the second battery 1235 by the charging power including the first power and the second power.

A charging adapter according to an embodiment comprises: a first battery; and a charging circuit configured to charge the first battery with external power and generate first power, wherein in a fast charging mode, the charging circuit is configured to charge a second battery in an electronic device detachably connected to the charging adapter based on the first power generated and the first battery is configured to generate a second power and charge the second battery with the second power while the charging circuit charges the second battery.

According to certain embodiments, in a normal charging mode, the charging circuit is configured to charge the second battery based on the first power.

According to certain embodiments, the charging circuit is configured to charge the first battery based on surplus power.

According to certain embodiments, in the fast charging mode, the charging circuit is configured to charge the second battery based on the first power when a predetermined time elapses after starting charging of the second battery or when the first battery is discharged.

According to certain embodiments, the charging circuit is configured to charge the first battery based on the external power in response to detachment of the electronic device from the charging adapter.

According to certain embodiments, a charging mode is determined to be the fast charging mode in response to detecting that the electronic device is in a power saving state or in an OFF state.

According to certain embodiments, a charging mode is determined to be the normal charging mode in response to detecting that the electronic device is in an ON state.

According to certain embodiments, the charging circuit comprises: a first voltage converter configured to convert an alternating current voltage into a direct current voltage; a first switch connected to the first voltage converter and the first battery; and a first controller configured to monitor the first battery and control the first voltage converter and the first switch.

According to certain embodiments, the first switch comprises a transistor and a diode, and wherein, in the fast charging mode, the diode is configured to start supplying the second power, and after a predetermined time, the transistor and the diode are configured to supply the second power.

According to certain embodiments, in the normal charging mode, the first controller is configured to turn of the first switch when charging of the first battery is completed.

A method according to certain embodiments, comprises: charging a first battery in a charging adapter based on external power and generating first power with a first charging circuit in the charging adapter; and charging a second battery in an electronic device detachably connected to the charging adapter, based on the first power, wherein charging the second battery comprises: charging, in a fast charging mode, the second battery with the first charging circuit based on the first power and with the first battery based on second power.

According to certain embodiments, the charging the second battery further comprises: charging, in the fast charging mode, the second battery based on the first power when a predetermined time elapses after charging of the second battery is started or when the first battery is discharged.

According to certain embodiments, the charging the second battery further comprises: charging, in a normal charging mode, the second battery based on the first power generated by the first charging circuit.

According to certain embodiments, the method further comprises determining a charging mode to be the fast charging mode when the electronic device is in a power saving state or in an OFF state; and determining the charging mode to be the normal charging mode when the electronic device is in an ON state.

A charging adapter for an electronic device, according to certain embodiments comprises: a first battery; and a charging circuit configured to charge the first battery based on external power and generate first power, wherein the charging adapter is configured to generate charging power that comprises the first power generated by first charging circuit and selectively includes second power by the first battery.

According to certain embodiments, the first battery is charged based on the external power in response to detachment of the charging adapter from a detachably connectable electronic device.

According to certain embodiments, the charging circuit comprises: a voltage converter configured to convert an alternating current voltage into a direct current voltage; a switch connected to the voltage converter and the first battery; and a controller configured to monitor the first battery and control the voltage converter and the switch.

According to certain embodiments, the switch comprises a transistor and a diode, wherein the diode is configured to start supplying the second power, and after a predetermined time, the transistor and the diode are configured to supply the second power.

According to certain embodiments, the second power by the first battery is selectively included based on whether a detachably connected electronic device is in a power saving state or in an OFF state.

According to certain embodiments, the charging adapter receives AC power from an external power source and wherein the generated charging power is DC.

The embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable gate array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter.

The described hardware devices may be configured to act as one or more software modules in order to perform the operations of the above-described embodiments, or vice versa.

While this disclosure includes embodiments, it will be apparent to one of ordinary skill in the art that various changes in form and details may be made in these embodiments without departing from the spirit and scope of the claims and their equivalents. The embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A charging adapter comprising:
a first battery; and
a charging circuit configured to charge the first battery with external power and generate first power,
wherein in a fast charging mode, the charging circuit is configured to charge a second battery in an electronic device detachably connected to the charging adapter based on the first power generated and the first battery is configured to generate a second power and charge the second battery with the second power while the charging circuit charges the second battery,
wherein, in a first charging section of the fast charging mode, the first power from the charging circuit and the second power from the first battery are supplied together to the electronic device such that peak power required in a process of a step charging for a fast charging of the second battery is generated,
wherein, after a predetermined time has elapsed from a start of the first charging section, charging in a second charging section is performed in order to reduce battery degradation, and
wherein, in the second charging section, a current lower than a current of the first charging section is supplied to the second battery based on the first power.

2. The charging adapter of claim 1, wherein in a normal charging mode, the charging circuit is configured to charge the second battery based on the first power.

3. The charging adapter of claim 2, wherein the charging circuit is configured to charge the first battery based on surplus power.

4. The charging adapter of claim 2, wherein, in the fast charging mode, the charging circuit is configured to charge the second battery based on the first power when the first battery is discharged.

5. The charging adapter of claim 1, wherein the charging circuit is configured to charge the first battery based on the external power in response to detachment of the electronic device from the charging adapter.

6. The charging adapter of claim 1, wherein a charging mode is determined to be the fast charging mode in response to detecting that the electronic device is in a power saving state or in an OFF state.

7. The charging adapter of claim 2, wherein a charging mode is determined to be the normal charging mode in response to detecting that the electronic device is in an ON state.

8. The charging adapter of claim 2, wherein the charging circuit comprises:
a first voltage converter configured to convert an alternating current voltage into a direct current voltage;
a first switch connected to the first voltage converter and the first battery; and
a first controller configured to monitor the first battery and control the first voltage converter and the first switch.

9. The charging adapter of claim 8, wherein the first switch comprises a transistor and a diode, and wherein, in the fast charging mode, the diode is configured to start supplying the second power, and after a predetermined time, the transistor and the diode are configured to supply the second power.

10. The charging adapter of claim 8, wherein, in the normal charging mode, the first controller is configured to turn off the first switch when charging of the first battery is completed.

11. A method comprising:
charging a first battery in a charging adapter based on external power and generating first power with a first charging circuit in the charging adapter; and
charging a second battery in an electronic device detachably connected to the charging adapter, based on the first power,
wherein charging the second battery comprises:
charging, in a fast charging mode, the second battery with the first charging circuit based on the first power and with the first battery based on second power,
wherein, in a first charging section of the fast charging mode, the first power from the first charging circuit and the second power from the first battery are supplied together to the electronic device such that peak power required in a process of a step charging for a fast charging of the second battery is generated,
wherein, after a predetermined time has elapsed from a start of the first charging section, charging in a second charging section is performed in order to reduce battery degradation, and
wherein, in the second charging section, a current lower than a current of the first charging section is supplied to the second battery based on the first power.

12. The method of claim 11, wherein the charging the second battery further comprises:
charging, in the fast charging mode, the second battery based on the first power when the first battery is discharged.

13. The method of claim 12, wherein the charging the second battery further comprises:
charging, in a normal charging mode, the second battery based on the first power generated by the first charging circuit.

14. The method of claim 13, further comprising:
determining a charging mode to be the fast charging mode when the electronic device is in a power saving state or in an OFF state; and
determining the charging mode to be the normal charging mode when the electronic device is in an ON state.

15. A charging adapter for an electronic device, the charging adapter comprising:
a first battery; and
a charging circuit configured to charge the first battery based on external power and generate first power,
wherein, in a fast charging mode, the charging adapter is configured to generate charging power that comprises the first power generated by charging circuit and selectively includes second power by the first battery,
wherein, in a first charging section of the fast charging mode, the first power from the charging circuit and the second power from the first battery are supplied together to the electronic device such that peak power required in a process of a step charging for a fast charging of a second battery comprised in the electronic device is generated,
wherein, after a predetermined time has elapsed from a start of the first charging section, charging in a second charging section is performed in order to reduce battery degradation, and
wherein, in the second charging section, a current lower than a current of the first charging section is supplied to the second battery based on the first power.

16. The charging adapter of claim 15, wherein the first battery is charged based on the external power in response to detachment of the charging adapter from a detachably connectable electronic device.

17. The charging adapter of claim 15, wherein the charging circuit comprises:
a voltage converter configured to convert an alternating current voltage into a direct current voltage;
a switch connected to the voltage converter and the first battery; and
a controller configured to monitor the first battery and control the voltage converter and the switch.

18. The charging adapter of claim 17, wherein the switch comprises a transistor and a diode, wherein the diode is configured to start supplying the second power, and after a predetermined time, the transistor and the diode are configured to supply the second power.

19. The charging adapter of claim 15, wherein the second power by the first battery is selectively included based on whether a detachably connected electronic device is in a power saving state or in an OFF state.

20. The charging adapter of claim 15, wherein the charging adapter receives AC power from an external power source and wherein the generated charging power is DC.

* * * * *